United States Patent
Sidley

(10) Patent No.: US 12,123,711 B1
(45) Date of Patent: Oct. 22, 2024

(54) POLE TENT BASE TEMPLATE

(71) Applicant: Michael Allan Sidley, Painesville, OH (US)

(72) Inventor: Michael Allan Sidley, Painesville, OH (US)

( * ) Notice: Subject to any disclaimer, the term of this patent is extended or adjusted under 35 U.S.C. 154(b) by 456 days.

(21) Appl. No.: 17/658,956

(22) Filed: Apr. 12, 2022

(51) Int. Cl.
*G01B 3/14* (2006.01)
*G01B 3/00* (2006.01)
*E04H 15/18* (2006.01)

(52) U.S. Cl.
CPC ............. *G01B 3/002* (2013.01); *E04H 15/18* (2013.01)

(58) Field of Classification Search
CPC .................................. G01B 3/002; G01B 5/26
USPC ................................... 33/1 G, 563, 565, 566
See application file for complete search history.

(56) References Cited

U.S. PATENT DOCUMENTS

| | | | | |
|---|---|---|---|---|
| 5,036,874 A * | 8/1991 | Lynch | ................. | E04H 15/26 33/1 G |
| 5,740,827 A | 4/1998 | Swarringim | | |
| 5,749,154 A * | 5/1998 | Scharf | ................. | B43L 7/027 33/563 |
| 6,141,880 A * | 11/2000 | Vircks | ................. | H01Q 11/14 33/1 G |
| 7,251,898 B2 * | 8/2007 | Schafer | ................. | B43L 7/027 33/566 |
| 7,421,796 B1 * | 9/2008 | DeAngelis-Morris | | A47G 1/205 33/1 G |
| 7,730,842 B1 * | 6/2010 | Sebrow | ................. | D06H 7/00 112/475.08 |
| 7,849,606 B2 * | 12/2010 | Laitta | ................. | E04H 4/14 33/1 G |
| 7,854,073 B1 * | 12/2010 | Webb | ................. | D05B 97/12 33/1 G |
| 7,984,562 B2 * | 7/2011 | Redmond | ............. | G01B 5/0023 33/1 G |
| 8,001,987 B2 * | 8/2011 | Williams | ................. | E04H 15/08 52/63 |
| 8,186,072 B1 * | 5/2012 | Nethery | ................. | D05B 97/12 33/565 |
| 8,186,073 B2 * | 5/2012 | Nethery | ................. | B43L 7/005 33/562 |
| 8,904,652 B2 * | 12/2014 | Derkach | ................. | G01C 15/04 33/1 G |
| 9,624,612 B2 * | 4/2017 | Works | ................. | D05B 97/12 |
| 9,683,386 B1 | 6/2017 | Morrison | | |
| 10,738,501 B2 * | 8/2020 | Tracy | ................. | E04H 15/64 |

(Continued)

FOREIGN PATENT DOCUMENTS

| | | |
|---|---|---|
| EP | 368626 | 5/1990 |
| FR | 2911894 | 8/2008 |

(Continued)

*Primary Examiner* — George B Bennett
(74) *Attorney, Agent, or Firm* — Robinson IP Law, PLLC

(57) ABSTRACT

A tent template comprising includes: a plurality of side members defining an outer perimeter of a tent; a plurality of stake locating members extending outwardly from the plurality of side members, the plurality of stake locating members including a distal end defining a location of a stake of the tent; and one or more triangulated members extending between a first of the plurality of side members and a second of the plurality of side members within the outer perimeter defined by the plurality of side members.

20 Claims, 4 Drawing Sheets

(56) References Cited

U.S. PATENT DOCUMENTS

| | | | |
|---|---|---|---|
| 11,738,591 B2* | 8/2023 | Ben Haim | B43L 13/001 33/563 |
| 2012/0204437 A1* | 8/2012 | Nethery | B43L 7/027 33/566 |
| 2013/0014681 A1* | 1/2013 | Kennedy | D05B 11/00 112/475.08 |
| 2015/0240400 A1* | 8/2015 | Baker | D05B 97/12 33/566 |
| 2019/0242152 A1 | 8/2019 | Tracy | |
| 2023/0018485 A1* | 1/2023 | Christopherson | G01B 3/02 |

FOREIGN PATENT DOCUMENTS

| | | |
|---|---|---|
| GB | 2498353 | 7/2013 |
| IN | 202111007867 | 5/2021 |
| RU | 173028 | 8/2017 |
| WO | WO20090504467 | 4/2009 |

* cited by examiner

POLE TENT BASE TEMPLATE

FIELD

This disclosure relates to the field of tents and construction of tents. More particularly, this disclosure relates to a template for erecting a tent, such as a pole tent.

BACKGROUND

Various types of temporary structures such as tents exist to provide shelter or an event space. Construction of existing tents, such as large pole tents, requires that dimensions of the tent be measured and located on a ground atop which the tent is to be constructed. Locations of corners of the tent must be determined, followed by manual squaring of the corners. Locations of various support poles and stakes must then be measured and located, such as by measuring a distance between each of the support poles and stakes. Measuring out locations for components of the tent may be laborious. Further, if locations of portions of the tent are found to have interference, such as by obstacles on the ground surface or nearby, a process of locating portions of the tent must begin again from the beginning, thereby significantly adding to the labor required to locate the tent.

Other problems may arise in the measuring of locations of the various support poles and stakes. For example, if a distance between one of the support poles and stakes is incorrect, subsequent measurements may also be incorrect, necessitating that a process of locating the poles and stakes of the tent be re-started.

Although a tent or components of the tent may be laid out on a ground surface prior to erecting the tent, it is impractical to first lay the tent across the ground to locate poles and stakes of the tent. In particular, large pole tents used for events are cumbersome and it may require significant effort to spread the tent out across the ground prior to erecting the tent. It may also be difficult to subsequently reposition large pole tents once placed on the ground.

What is needed, therefore, is a template that allows for a location of a tent, in particular large pole tents, to be determined prior to erecting the tent.

SUMMARY

The above and other needs are met by a tent template that allows for locating a tent and components thereof. In a first aspect, a tent template includes: a plurality of side members defining an outer perimeter of a tent; a plurality of stake locating members extending outwardly from the plurality of side members, the plurality of stake locating members including a distal end defining a location of a stake of the tent; and one or more triangulated members extending between a first of the plurality of side members and a second of the plurality of side members within the outer perimeter defined by the plurality of side members.

The plurality of side members, the plurality of stake location members, and the one or more triangulated members may be formed of straps or webbing having a width of from about 0.5 inches to about 3 inches. The plurality of side members of the tent template may include a first side member; a second side member; a third side member; and a fourth side member. The first side member, second side member, third side member, and fourth side member define a rectangle having a size corresponding to a size of the tent.

The one or more triangulated members may extend from a first end at one of the first side member and third side member and a second end at one of the second side member and fourth side member. The tent template may further include a pair of the one or more triangulated members located at each of a first end of the tent template and a second end of the tent template. The one or more triangulated members and the plurality of side members may define a right triangle.

The tent template may further include a plurality of grommets located through the plurality of side members. One or more of the plurality of stake locating members may further include a "Y" and "V" shaped portion located on distal ends of the one or more of the plurality of stake locating members.

The rectangle defined by the first side member, the second side member, the third side member, and the fourth side member may have a length of from about 40 feet to about 90 feet and a width of from about 20 feet to about 40 feet.

The tent template may further include a central member extending across a width of the tent template along a mid-point of the tent template. The tent template may also include a visual indicator located at corners of the rectangle. The visual indicator may be one or more painted portions of the plurality of side members.

The plurality of side members, plurality of stake locating members, and one or more triangulated members may be formed nylon strapping.

In another aspect, a tent template includes: a rectangular portion comprising a first side member, a second side member, a third side member, and a fourth side member, the rectangular portion defining an area of a tent; a plurality of stake locating members located on the first side member, the second side member, the third side member, and the fourth side member, the plurality of stake locating members extending perpendicular to and outward away from the rectangular portion; at least one pair of triangulated members. The pair of triangulated members extend from first ends at one of the first side member and third side member to second ends at the second side member and fourth side member.

The tent template may further include a second pair of triangulated members, the second pair of triangulated members extending from first ends at one of the first side member and third side member to second ends at the second side member and fourth side member.

In yet another aspect, a tent template includes: a rectangular portion comprising a first side member, a second side member, a third side member, and a fourth side member, the rectangular portion defining an area of a tent; a plurality of stake locating members located on the first side member, the second side member, the third side member, and the fourth side member, the plurality of stake locating members extending perpendicular to and outward away from the rectangular portion; a first triangulated member extending from a first end at the first side member to a second end at the second side member; a second triangulated member extending from a first end at the first side member to a second end at the fourth side member; a third triangulated member extending from a first end at the third side member to a second end at the second side member; and a fourth triangulated member extending from a first end at the third side member to a second end at the fourth side member.

The first ends of the first triangulated member and the second triangulated member may be located at a middle of the first side member and the first ends of the third triangulated member and the fourth triangulated member may be located at a middle of the third side member.

The tent template may further include grommets located at corners of the rectangular portion. Corners of the rectangular portion may be painted to provide a visual indication of the corners of the rectangular portion.

One or more of the plurality of stake locating members may further include one of a "Y" and "V" shaped portion located on distal ends of the one or more of the plurality of stake locating members.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

DETAILED DESCRIPTION

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

Figure 1:
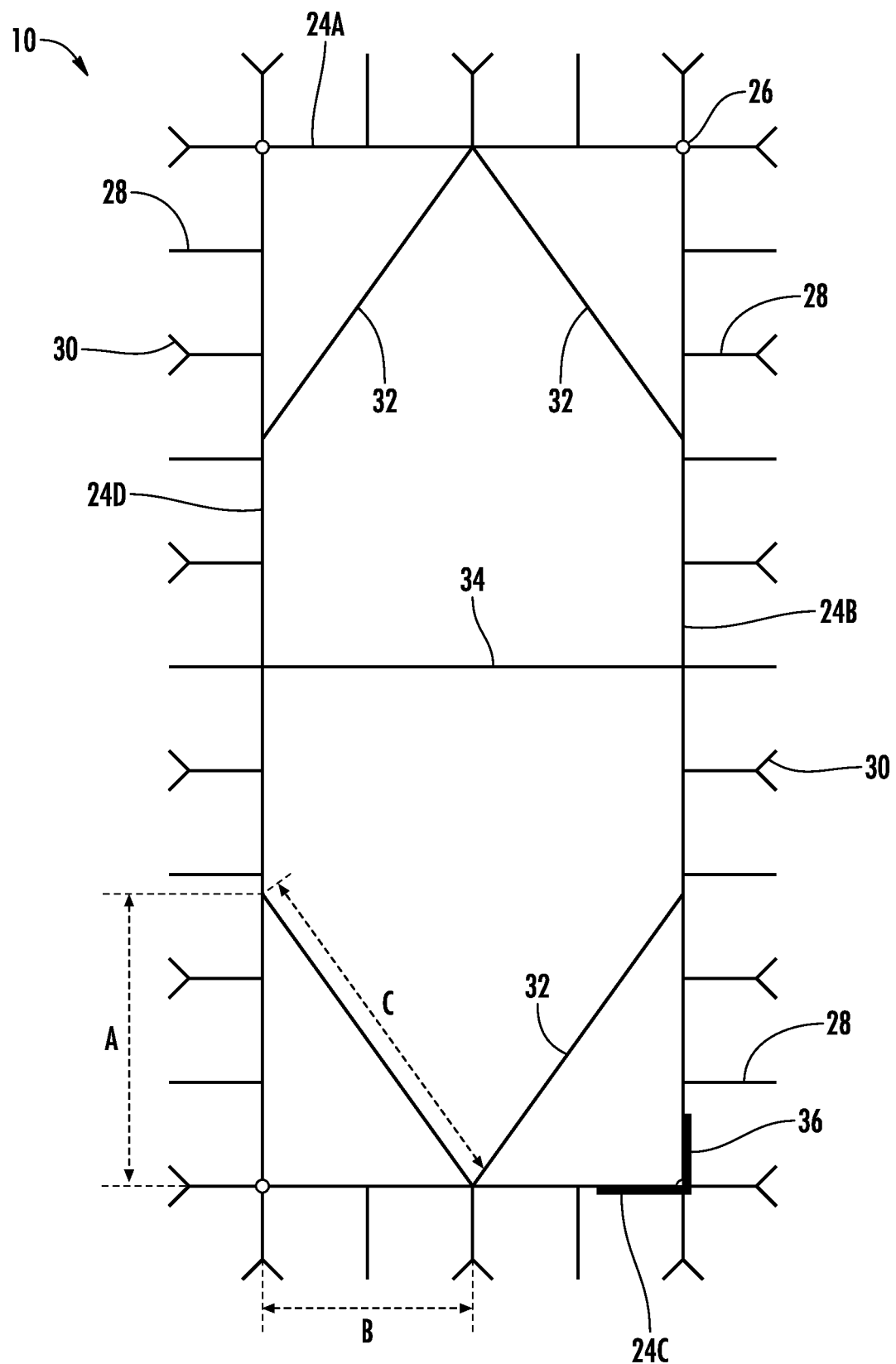
FIG. 1 shows a top plan view of a tent template according to one embodiment of the present disclosure.
Figure 4:
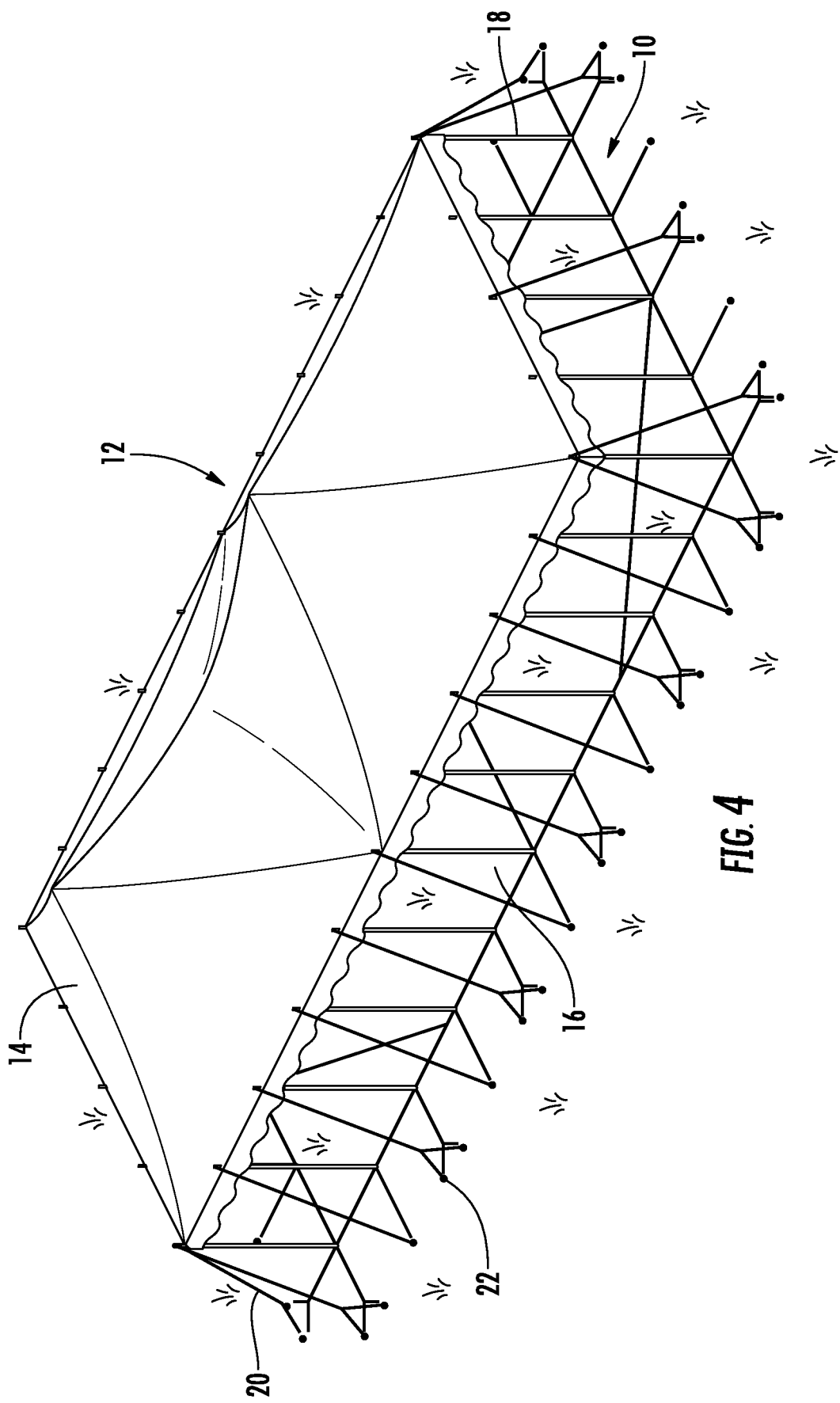
FIG. 4 shows a tent constructed over a tent template according to one embodiment of the present disclosure.

FIG. 1 shows a basic embodiment of a tent template 10 for constructing a tent, such as a large pole tent. FIG. 4 shows an example of a suitable tent 12 for construction using the tent template 10 and methods described herein. The tent 12 may include a canopy 14 forming a roof of the tent 12. The canopy 14 may be sized to cover an area 16, such as an area where an event may take place or otherwise be desired to be covered by the tent 12. The area 16 covered by the tent 12 corresponds to a size of the tent 12 when fully constructed. The tent template 10 described herein may advantageously be used to aid in constructing the tent 12 and to locate an area of the tent 10 along with various components of the tent 10 prior to fully constructing the tent 12 to ensure that a particular area is suitable for locating the tent 10 thereon.

The tent 12 includes a plurality of support poles 18 located along and around a perimeter of the tent 12. For example, when the tent 12 is rectangular in shape, the plurality of support poles 18 may be located at spaced apart distances along sides of the tent 12 and at corners of the tent 12 when the tent 12 is constructed. The tent 12 further includes a plurality of guy wires 20 secured to the plurality of support poles 18. The plurality of guy wires 20 may be secured at a first end of the plurality of guy wires 20 to a top of each of the plurality of support poles 18. Second ends of the plurality of guy wires 20 may be fixed at ground level, such as to one or more stakes 22 inserted into a ground surface around the tent 12. The plurality of guy wires 20 preferably extend outward away from the tent 12 at an angle to aid in maintaining the tent 12 upright. Each of the plurality of support poles 18 may be connected to a single of the plurality of guy wires 20 or two or more guy wires 22 to support the plurality of support poles 18 in an upright position.

FIG. 1 shows a top plan view of the tent template 10 lying on a ground surface in an unfurled configuration. When unfurled, the tent template 10 is arranged in a size that is proximate to the area 16 (FIG. 4) that is covered by the tent 12 including locations of the plurality of support poles 18 and the one or more stakes 22 such that a total area occupied by the tent 12 when constructed may be determined. The tent template 10 is formed of a plurality of elongate members described below, with the plurality of elongate members being formed such that the tent template 10 is readily collapsed or rolled for transportation and storage. For example, the plurality of elongate members may be formed of straps or webbing, or other similar flexible or compliant materials that would allow the tent template 10 to be collapsed, rolled, or otherwise stored when not in use. In one example, the plurality of elongate members are made of nylon strapping, such as nylon strapping having a width of from about 1 inch to about 2 inches.

The tent template includes elongate members that include a first side member 24A, a second side member 24B, a third side member 24C, and a fourth side member 24D. The first side member 24A, second side member 24B, third side member 24C, and fourth side member 24D are shown as forming a rectangular outline corresponding to the area 16 (FIG. 4) of the tent 12. However, it is also understood that the tent template 10 may include additional side members and may form other polygonal shapes depending on a shape of the tent 12 to be constructed. When the tent template 10 forms a rectangle, in the top-down view of FIG. 1 the first side member 24A may correspond to a top side, the second side member 24B may correspond to a right-hand side, the third side member 24C may correspond to a bottom side, and the fourth side member 24D may correspond to a left-hand side. The elongate members are sized based on a desired size of the tent 12. For example, for a rectangular tent that is 30 feet wide and 75 feet long, a size of the tent template 10 is 30 feet wide and 75 feet long.

The tent template 10 may include a plurality of grommets 26 located on the elongate members. For example, the plurality of grommets 26 may be located at corners of the tent template 10 and may further be located at intersections of the elongate members as shown in FIG. 1. The grommets 26 may be located at other locations along lengths of the elongate members of the tent template 10 to further align the tent template 10 on a ground surface and maintain the tent template 10 in a desired position. The grommets 26 may be shaped to receive a stake therethrough to secure the tent template 10 to a ground surface while laying out a location of the tent 12. The grommets 26 may be, for example, brass grommets located through the elongate members of the tent template. When the elongate members are formed of strapping, the brass grommets may be located through an aperture formed in the strapping. The grommets may have an inner diameter that is sized to receive a stake. For example, an inner diameter of the grommets may be from about ¼" to about 1". In a further example, the plurality of grommets may have an inner diameter of ½" such that a 12"×⅜" spike may be inserted through the grommets into a ground surface to secure the tent template 10 in place.

The tent template 10 further includes a plurality of stake locating members 28. The plurality of stake locating members 28 extend outwardly from the first side member 24A, the second side member 24B, the third side member 24C, and the fourth side member 24D. The plurality of stake locating members 28 may extend perpendicular to the elongate members of the tent template 10. The plurality of stake locating members 28 may be formed of a material that is the same as or similar to a material of the elongate members of the tent template, such as straps or webbing. The plurality of stake locating members 28 are joined at first ends to the elongate members of the tent template, as shown in FIG. 1. The plurality of stake locating members 28 are elongate in shape and extend to second ends that are located distal from the tent template 10 and located proximate to a location where the stakes 22 are desired to be located.

One or more of the plurality of stake locating members 28 may have a substantially "Y" or "V" shaped portion 30 towards ends of the plurality of stake locating members 28. The "Y" or "V" shaped portion 30 of the stake locating members 28 may be shaped to locate two or more guy wires to be secured on one of the support poles. For example, the "Y" or "V" shaped portion 30 may allow for locations of two stakes to be determined with each stake to secure a guy wire to a nearby support pole. The "Y" or "V" shaped portion 30 may be located on alternating of the plurality of stake locating members 28 along sides of the tent template 10. Alternatively, the "Y" or "V" shaped portion 30 may be located on each of the plurality of stake locating members 28, or may be otherwise located around the tent template 10 depending on a desired location of stakes for a tent to be constructed.

With further reference to FIG. 1, the tent template 10 further includes one or more triangulated members 32 located between the elongate members of the tent template. The one or more triangulated members 32 may be secured at a first end along a first side of the tent template 10 and at a second end along a second side of the tent template 10. As shown in FIG. 1, a pair of triangulated members 32 may be located at opposing ends of the tent template 10 when the tent template 10 is rectangular in shape. At one end of the tent template 10, the triangulated members 32 may extend from the first side member 24A to the second side member 24B and the fourth side member 24D. At another end of the tent template 10, the triangulated members 32 may extend from the third side member 24C to the second side member 24B and the fourth side member 24D. The triangulated members 32 may be joined to the first side member 24A and the third side member 24C at centers of the first side member 24A and the third side member 24C, as shown in FIG. 1.

The triangulated members 32 are located and dimensioned such that the triangulated members 32 facilitate squaring of the tent template 10 when the tent template 10 is located on a ground surface for construction of a tent. The triangulated members 32 have a length C. The triangulated members 32 are located along sides of the tent template 10 such that an area defined between the triangulated members 32 and sides of the tent template 10 form a right triangle. First triangulated sides A are defined along the second side member 24B and fourth side member 24D. Second triangulated sides B are defined along the first side member 24A and the third side member 24C. Lengths of the first triangulated sides A, second triangulated sides B, and the length C of the triangulated members 32 defined according to the relationship between sides of a right triangle. Ends of the triangulated members 32 may be joined to the first side member 24A and third side member 24C at midpoints of the first side member 24A and the third side member 24C, as shown in FIG. 1.

The tent template 10 may further include a central member 34. The central member 34 may be located at or proximate to a midpoint of the tent template 10 along a length of the tent template 10. The central member 34 may include ends that extend beyond sides of the tent template 10 such that the ends of the central member 34 may be further used to locate stakes for a tent constructed with the tent template 10.

Portions of the tent template 10 may be painted or may otherwise include visual indicators for identifying portions of the tent template 10. For example, the tent template 10 may include painted portions 36 located at corners of the tent template 10 to aid in identifying the corners during unfurling of the tent template 10.

In one non-limiting example, the tent template 10 may be sized for construction of a large pole-type tent. For example, a large pole-type tent may have dimensions such as a length of approximately 75 feet and a width of approximately 30 feet. The large pole-type tent may have a significant number of support poles, such as 32 poles as shown in the figures. The support poles may be located approximately 7.5 feet apart from one another. Further, locations of stakes may be approximately 6 feet outward from each support pole. The tent template 10 may be dimensioned such that the tent template 10 provides locations for each of the support poles at proper spacing and further provides locations for any stakes required for the support poles. Although the above example contemplates a tent having the above-described dimensions, it is understood that a tent template such as the tent template described in this non-limiting example may be constructed in other suitable shapes and have other suitable dimensions to aid in construction of a tent varying in dimensions and shape from this non-limiting example.

Figure 2:
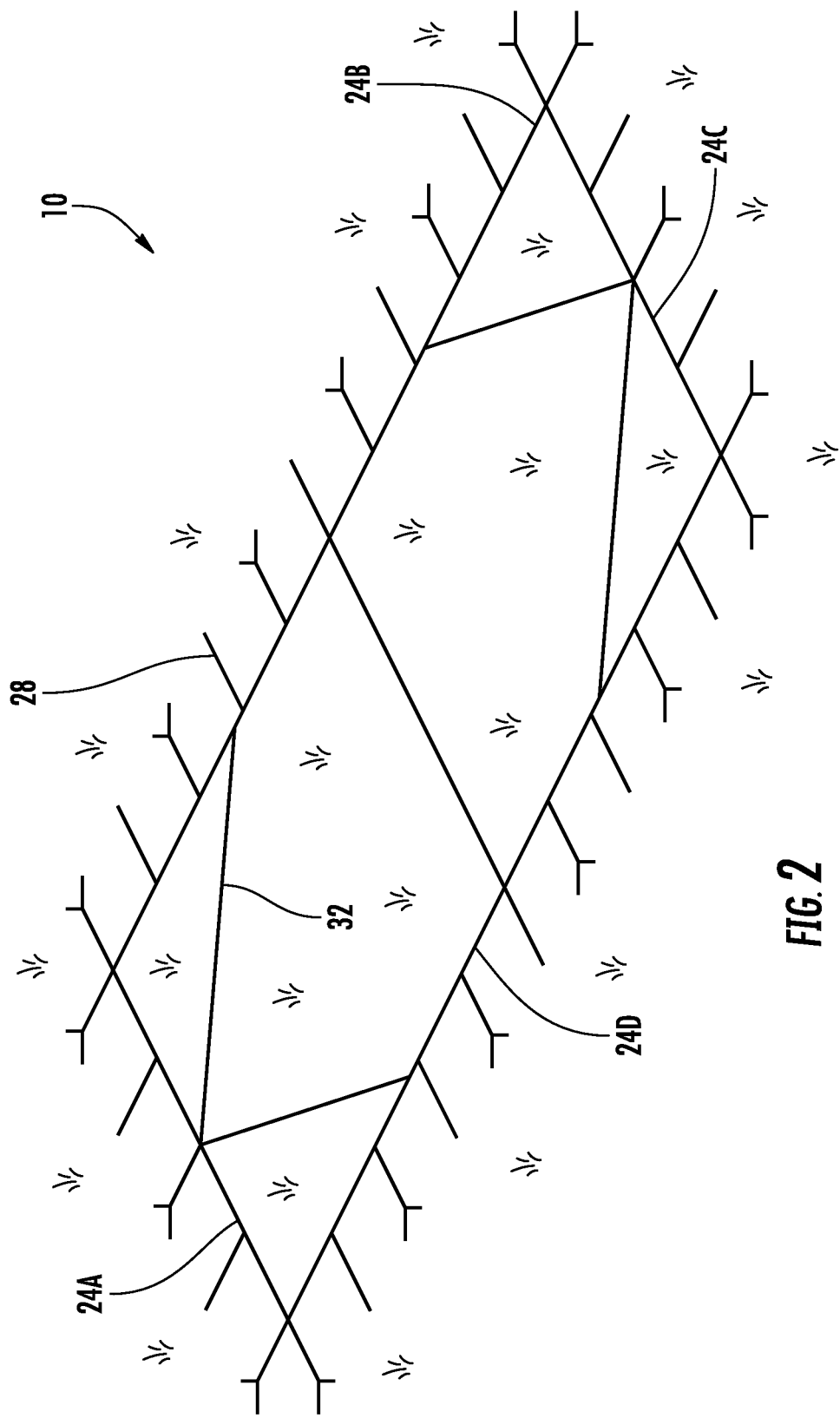
FIG. 2 shows a perspective view of a tent template unfurled on a ground surface according to one embodiment of the present disclosure.

The tent template 10 may be used to facilitate the location of components of a tent to be constructed and in the subsequent construction of a tent. Referring to FIG. 2, in a first step the tent template 10 may be spread across a surface, such as a ground surface on which a tent is desired to be located. The tent template 10 may be unrolled or unfolded from a stored position to a deployed position as shown in FIG. 2 in which the tent template 10 is extended over a ground surface. The tent template 10 may be fully expanded, such as by pulling on side members of the tent template 10. The triangulated members 32 ensure that the tent template 10 remains squared on the ground for proper alignment of the tent template 10. One or more stakes may be inserted through the plurality of grommets 26 to secure the tent template 10 on a ground surface.

Figure 3:
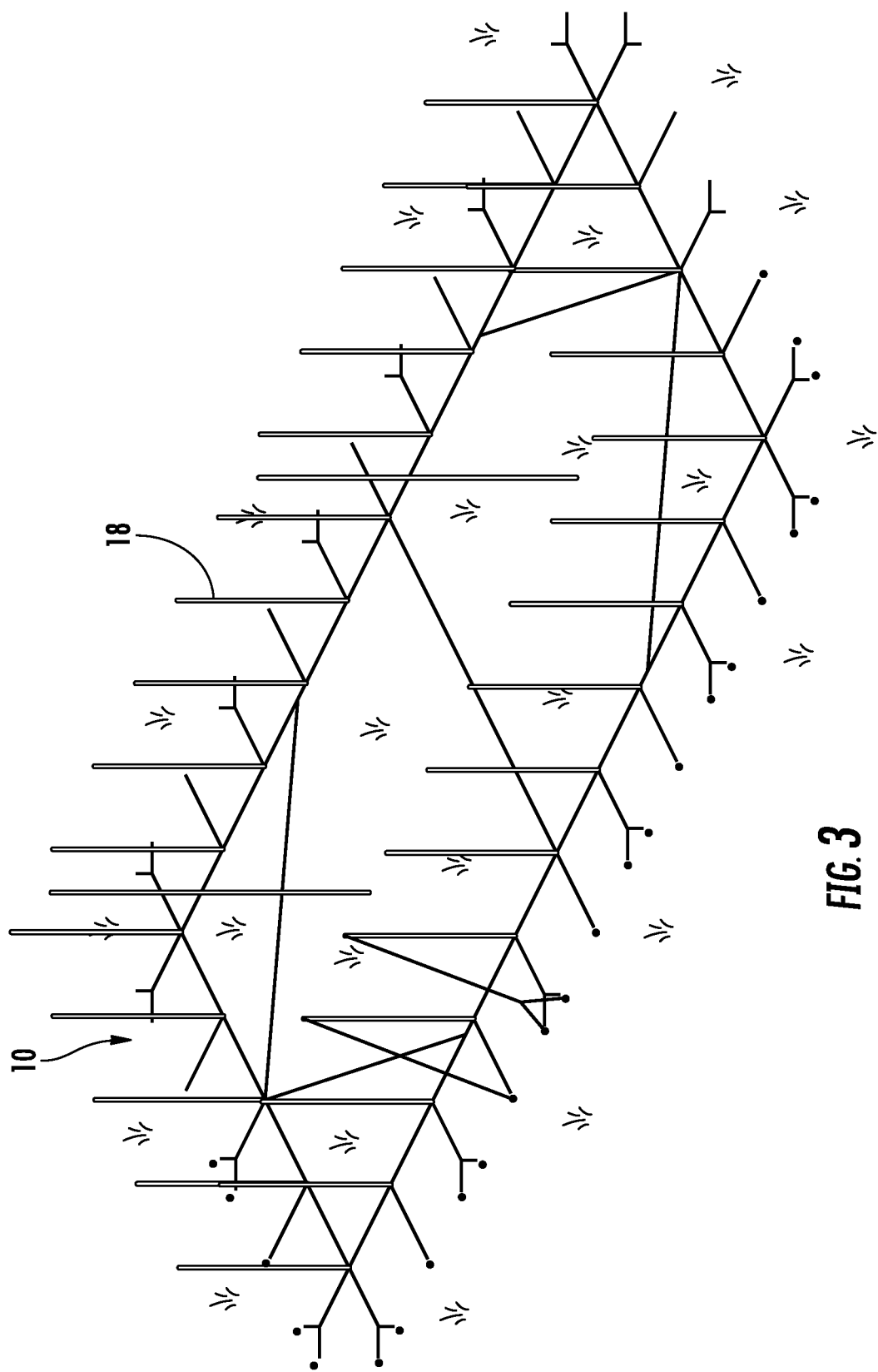
FIG. 3 shows portions of a tent aligned on a tent template according to one embodiment of the present disclosure.

When the tent template 10 is deployed on a ground surface, an area of a tent to be erected may be determined and locations for components of the tent found. The tent template 10 may allow for identification of locations for the plurality of support poles 18 located around the tent, as illustrated in FIG. 3. Locations for any stakes that may be required to support the support poles 18 with guy wires may also be located. Locations of the support poles 18 and any required stakes may be marked, such as with paint on a ground surface on which the tent template 10 is located. Although the figures show the tent template 10 remaining in place while the tent 12 is constructed, it is understood that the tent template 10 may be removed prior to construction of the tent 12 but after marking of components where the tent may be located using the tent template 10.

When the tent template 10 is desired to be picked up or stowed, the tent template 10 may be rolled or folded into a stowed position. For example, opposing corners of the tent template 10 may pulled and the tent template 10 subsequently rolled, such as on a spool. When the elongate members are formed of flexible materials such as straps or webbing, the elongate members may be rolled around a spool or otherwise folded or stowed when the tent template is not in use.

The tent template 10 described herein provides many advantages in locating and constructing a tent or other shelter, and in particular larger tents. The tent template 10 an overall area of the tent 10 to be determined prior to undergoing the time and effort of constructing the tent. Further, components of the tent may be located on a ground surface prior to construction of the tent, thereby allowing any obstacles that may interfere with placement of components of the tent to be identified prior to construction of the tent. The tent template further reduces the likelihood of incorrect measurements being taken to locate positions of components of the tent, and further significantly reduces an amount of time required to locate components of the tent before and during construction of the tent. The tent template is further easily manipulated by hand along the ground surface, thereby reducing difficulties associated with locating the template and subsequently locating elements of the tent on the ground surface.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A tent template comprising:
   a plurality of side members defining an outer perimeter of a tent;
   a plurality of stake locating members extending outwardly from the plurality of side members, the plurality of stake locating members including a distal end defining a location of a stake of the tent; and
   one or more triangulated members extending between a first of the plurality of side members and a second of the plurality of side members within the outer perimeter defined by the plurality of side members.

2. The tent template of claim 1, wherein the plurality of side members, the plurality of stake locating members, and the one or more triangulated members are formed of one of straps or webbing have a width of from about 0.5 inches to about 3 inches.

3. The tent template of claim 1, the plurality of side members comprising:
   a first side member;
   a second side member;
   a third side member; and
   a fourth side member;
   wherein the first side member, second side member, third side member, and fourth side member define a rectangle having a size corresponding to a size of the tent.

4. The tent template of claim 3, wherein the one or more triangulated members extend from a first end at one of the first side member and third side member and a second end at one of the second side member and fourth side member.

5. The tent template of claim 4, further comprising a pair of the one or more triangulated members located at each of a first end of the tent template and a second end of the tent template.

6. The tent template of claim 4, wherein the one or more triangulated members and the plurality of side members define a right triangle.

7. The tent template of claim 1, further comprising a plurality of grommets located through the plurality of side members.

8. The tent template of claim 1, wherein one or more of the plurality of stake locating members further comprise one of a "Y" and "V" shaped portion located on distal ends of the one or more of the plurality of stake locating members.

9. The tent template of claim 3, the rectangle defined by the first side member, the second side member, the third side member, and the fourth side member having a length of from about 40 feet to about 90 feet and a width of from about 20 feet to about 40 feet.

10. The tent template of claim 3, further comprising a central member extending across a width of the tent template along a mid-point of the tent template.

11. The tent template of claim 3, further comprising a visual indicator located at corners of the rectangle.

12. The tent template of claim 11, the visual indicator comprising one or more painted portions of the plurality of side members.

13. The tent template of claim 1, the plurality of side members, plurality of stake locating members, and one or more triangulated members comprising nylon strapping.

14. A tent template comprising:
   a rectangular portion comprising a first side member, a second side member, a third side member, and a fourth side member, the rectangular portion defining an area of a tent;
   a plurality of stake locating members located on the first side member, the second side member, the third side member, and the fourth side member, the plurality of stake locating members extending perpendicular to and outward away from the rectangular portion;
   at least one pair of triangulated members, wherein the pair of triangulated members extend from first ends at one of the first side member and third side member to second ends at the second side member and fourth side member.

15. The tent template of claim 14, further comprising a second pair of triangulated members, the second pair of triangulated members extending from first ends at one of the first side member and third side member to second ends at the second side member and fourth side member.

16. A tent template comprising:
   a rectangular portion comprising a first side member, a second side member, a third side member, and a fourth side member, the rectangular portion defining an area of a tent;
   a plurality of stake locating members located on the first side member, the second side member, the third side member, and the fourth side member, the plurality of stake locating members extending perpendicular to and outward away from the rectangular portion;
   a first triangulated member extending from a first end at the first side member to a second end at the second side member;

a second triangulated member extending from a first end at the first side member to a second end at the fourth side member;
  a third triangulated member extending from a first end at the third side member to a second end at the second side member; and
  a fourth triangulated member extending from a first end at the third side member to a second end at the fourth side member.

17. The tent template of claim 16, wherein:
  the first ends of the first triangulated member and the second triangulated member are located at a middle of the first side member and
  the first ends of the third triangulated member and the fourth triangulated member are located at a middle of the third side member.

18. The tent template of claim 16, further comprising grommets located at corners of the rectangular portion.

19. The tent template of claim 16, wherein corners of the rectangular portion are painted to provide a visual indication of the corners of the rectangular portion.

20. The tent template of claim 16, wherein one or more of the plurality of stake locating members further comprise one of a "Y" and "V" shaped portion located on distal ends of the one or more of the plurality of stake locating members.

* * * * *